(12) United States Patent
Sato

(10) Patent No.: US 11,390,553 B2
(45) Date of Patent: Jul. 19, 2022

(54) GLASS TUBE PRODUCTION METHOD

(71) Applicant: NIPPON ELECTRIC GLASS CO., LTD., Shiga (JP)

(72) Inventor: Masahiko Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 597 days.

(21) Appl. No.: 16/321,458

(22) PCT Filed: Jul. 24, 2017

(86) PCT No.: PCT/JP2017/026714
§ 371 (c)(1),
(2) Date: Jan. 28, 2019

(87) PCT Pub. No.: WO2018/034110
PCT Pub. Date: Feb. 22, 2018

(65) Prior Publication Data
US 2021/0284566 A1 Sep. 16, 2021

(30) Foreign Application Priority Data

Aug. 16, 2016 (JP) .............................. JP2016-159658

(51) Int. Cl.
| C03B 23/09 | (2006.01) |
| C03B 23/18 | (2006.01) |
| B08B 5/02 | (2006.01) |
| B08B 9/032 | (2006.01) |
| C03B 33/06 | (2006.01) |

(52) U.S. Cl.
CPC .............. *C03B 23/099* (2013.01); *B08B 5/02* (2013.01); *B08B 9/0321* (2013.01); *C03B 23/18* (2013.01); *B08B 2209/032* (2013.01); *C03B 33/06* (2013.01)

(58) Field of Classification Search
None
See application file for complete search history.

(56) References Cited

U.S. PATENT DOCUMENTS

| 2,379,343 A * | 6/1945 | Cozzoli ................. C03B 23/112 |
| | | 65/271 |
| 3,212,870 A | 10/1965 | Condon |
| 2004/0007280 A1 | 1/2004 | Rausch et al. |

(Continued)

FOREIGN PATENT DOCUMENTS

| EP | 0484836 A1 | 5/1992 |
| JP | H04265241 A | 9/1992 |

(Continued)

OTHER PUBLICATIONS

JP 2003286045 machine translation, Mizutari et al., Oct. 2003 (Year: 2003).*

*Primary Examiner* — Queenie S Dehghan
(74) *Attorney, Agent, or Firm* — Proskauer Rose LLP

(57) ABSTRACT

A method for manufacturing a glass tube is disclosed that includes the step of forming a through hole in a tube wall of a glass tube with two ends including a first end and a second end, each having an opening, near the first end. The method further includes the step of forming a sealed portion by performing thermal processing on a predetermined portion of the glass tube between the first end and the through hole after the formation of the through hole.

5 Claims, 2 Drawing Sheets

(56) References Cited

U.S. PATENT DOCUMENTS

2004/0129026 A1\* 7/2004 Bartsch .................. C03B 23/11
                                                              65/86
2015/0020659 A1   1/2015  Hoshiba et al.

FOREIGN PATENT DOCUMENTS

| JP | 2003286045 A | \* | 10/2003 | ........... C03B 23/045 |
| JP | 2004010475 A |    | 1/2004  |                         |
| WO | 2013111432 A1 |   | 8/2013  |                         |

\* cited by examiner

GLASS TUBE PRODUCTION METHOD

TECHNICAL FIELD

The present invention relates to a method for manufacturing a glass tube.

BACKGROUND ART

In order to obtain a glass medicinal container, a glass tube is used that includes a sealed end and a through hole formed in the tube wall near the sealed end (patent document 1). As disclosed in patent document 1, such a glass tube is manufactured by sealing one open end of a glass tube and forming a through hole in the tube wall near the end.

PRIOR ART LITERATURE

Patent Literature

Patent Document 1: Japanese Laid-Open Patent Publication No. 2004-010475

SUMMARY OF THE INVENTION

Problem to be Solved by the Invention

When forming a through hole in the tube wall of the glass tube, impurities such as fumes are produced. When a through hole is formed in the tube wall near the sealed end of a glass tube like in the prior art described above, impurities are easily deposited inside the glass tube. Such impurities deteriorate the cleanliness of the inside of the glass tube.

The present invention is made in view of such circumstances, and its objective is to provide a method for manufacturing a glass tube that enhances the cleanliness of the inside of the glass tube, which includes a sealed end and a through hole formed in the tube wall near the sealed end.

Means for Solving the Problem

A method for manufacturing a glass tube that solves the above problem includes the step of forming a through hole in a tube wall of a glass tube with two ends including a first end and a second end, each having an opening, near the first end. The method further includes the step of forming a sealed portion by performing thermal processing on a predetermined portion of the glass tube between the first end and the through hole after the formation of the through hole.

With this method, the sealed portion is formed after the formation of the through hole so that impurities produced when forming the through hole can be discharged from the opening in the first end of the glass tube.

With the method for manufacturing a glass tube, it is preferred that the formation of the through hole be performed while sending air into the glass tube from the opening in the second end of the glass tube toward the opening in the first end of the glass tube.

With this method, the impurities produced when forming the through hole can be forced out of the opening in the first end of the glass tube.

With the method for manufacturing a glass tube, it is preferred that the formation of the through hole be performed with a burner in a state in which the glass tube is supported at a position where an axis of the glass tube is horizontal or a position where the first end of the glass tube is located at an upper side.

With this method, the volatile substances produced when forming the through hole in the glass tube with the burner are easily discharged from the opening in the first end of the glass tube.

With the method for manufacturing a glass tube, it is preferred that the formation of the through hole be performed with a burner that uses a gas mixture of oxygen and hydrogen as fuel, and that the burner be arranged so that a distance between a nozzle edge of the burner when being used and the glass tube is greater than or equal to 3 mm.

With this method, the usage of the gas mixture of oxygen and hydrogen as the fuel for the burner shortens the time required for forming the through hole in the glass tube. Further, the through hole is formed with the burner that is spaced apart from the glass tube so that the distance between the nozzle edge of the burner and the glass tube is greater than or equal to 3 mm. This reduces the impurities (volatile substances) that are produced during the formation of the through hole and collect on the nozzle edge of the burner.

With the method for manufacturing a glass tube, it is preferred that the glass tube be used as a medicinal container.

A medicinal container requires high cleanliness. Thus, the use of the glass tube is preferred when manufacturing a medicinal container.

Effect of the Invention

The present invention succeeds in enhancing the cleanliness of the inside of a glass tube that includes a sealed end and a through hole arranged in a tube wall near the sealed end.

MODE FOR CARRYING OUT THE INVENTION

One embodiment of a method for manufacturing a glass tube according to the present invention will now be described with reference to the drawings.

Figure 1:
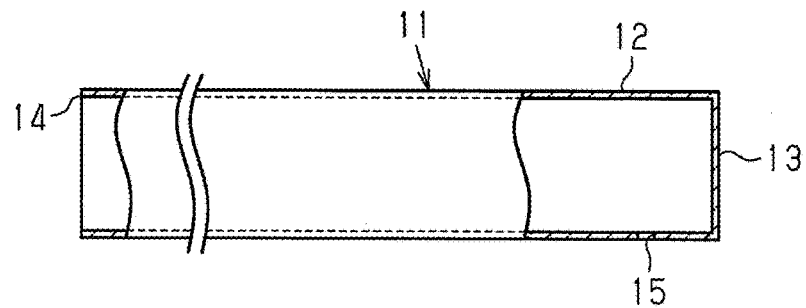
FIG. 1 is a schematic diagram of a glass tube according to an embodiment.

As shown in FIG. 1, a glass tube 11 that is the subject of manufacture includes a tube portion 12 including two ends. The glass tube 11 includes a sealed portion 13 that is located at one end of the tube portion 12 and an opening 14 that is located at the other end of the tube portion 12. A through hole 15 is formed in the tube wall near the sealed portion 13 of the tube portion 12.

Figure 2:
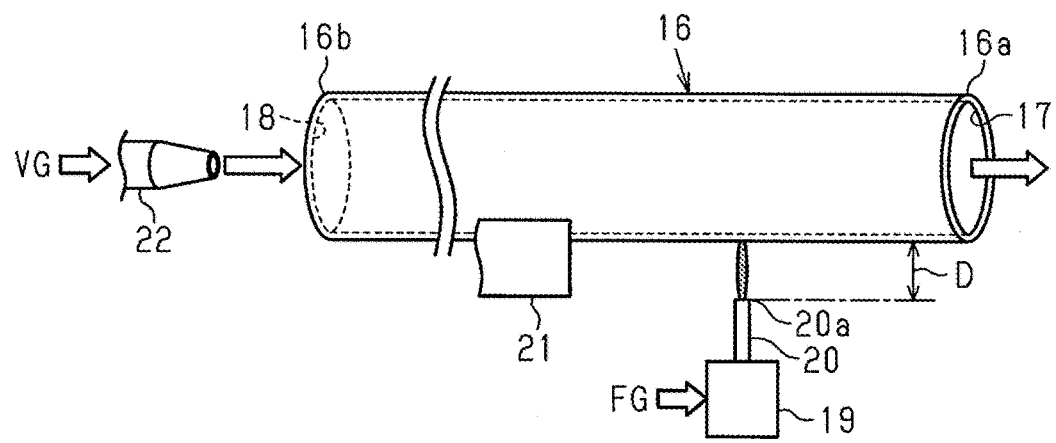
FIG. 2 is a schematic diagram illustrating a through hole forming step in accordance with a method for manufacturing the glass tube.
Figure 5:
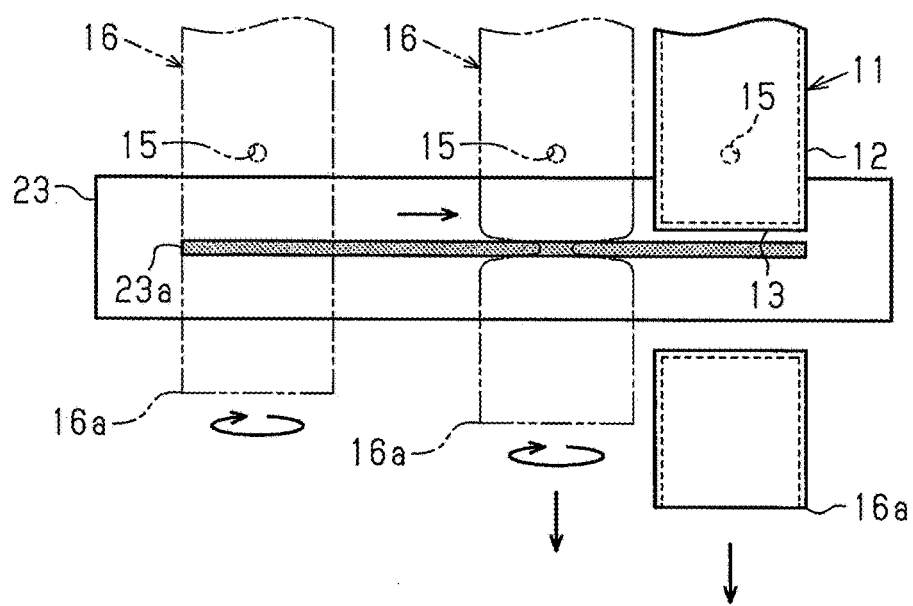
FIG. 5 is a schematic diagram illustrating a sealed portion forming step in accordance with the method for manufacturing a glass tube.

As shown in FIGS. 2 and 5, the glass tube 11 is manufactured from a glass tube 16 that includes two open ends.

The method for manufacturing the glass tube 11 includes a through hole forming step of forming the through hole 15 in the glass tube 16, and a sealed portion forming step of forming the sealed portion 13 in the glass tube 16.

As shown in FIG. 2, the through hole forming step is performed on the glass tube 16 that includes an opening 17 in a first end 16a and an opening 18 in a second end 16b. For example, the glass tube 16 may be a straight tube that is formed from molten glass through the Danner process or the down-draw process (Vello process) and cut into a predetermined length.

In the through hole forming step, the through hole 15 is formed in the tube wall of the glass tube 16 near the first end 16a. In the through hole forming step of the present embodiment, the through hole 15 is formed with a burner 19. The burner 19 includes a fuel gas nozzle 20 that emits fuel gas FG toward the glass tube 16.

In the through hole forming step, it is preferred that the through hole 15 be formed in a state in which the glass tube 16 is supported at a position where the axis of the glass tube 16 is horizontal or a position where the first end 16a of the glass tube 16 is located at an upper side. In the present embodiment, a support 21 is used to support the glass tube 16 at a position where the axis of the glass tube 16 is horizontal. Preferably, the burner 19 is arranged to direct a flame from vertically below the axis of the glass tube 16. The combustion performed by the burner 19 may be of a pre-mixing type that mixes the fuel gas FG and air prior to combustion or a diffusion-mixing type (nozzle mixing type) in which the fuel gas FG and air are diffused and mixed when burned. The premixed type may be of a total premixing type in which the amount of premixed air is greater than the theoretical amount of air or a partial premixing type in which the amount of premixed air is less than the theoretical amount of air.

Preferably, a mixture of a flammable gas and a supporting gas is used as the fuel gas FG in the through hole forming step. Examples of the flammable gas include hydrogen, liquefied petroleum gas (LPG), and liquefied natural gas (LNG). An example of the supporting gas is oxygen. Preferably, the fuel gas FG is a gas mixture of oxygen and hydrogen. In this case, the high flame temperature allows the through hole 15 to be formed in a relatively short time even when a nozzle edge 20a of the fuel gas nozzle 20 of the burner 19 is moved away from the glass tube 16. Preferably, the gas mixture has a volume ratio of hydrogen to oxygen (that is, volume of hydrogen/volume of oxygen) that is greater than or equal to 1 and less than or equal to 3.

In the through hole forming step, a distance D between the nozzle edge 20a of the fuel gas nozzle 20 of the burner 19 and the glass tube 16 is preferably greater than or equal to 3 mm, further preferably greater than or equal to 5 mm, and even further preferably greater than or equal to 7 mm. As the distance D increases, impurities such as fumes produced when forming the through hole 15 are less likely to collect on the nozzle edge 20a. Further, the distance D is preferably less than or equal to 15 mm, and further preferably less than or equal to 12 mm. As the distance D decreases, the time required for forming the through hole 15 in the glass tube 16 becomes shorter. Accordingly, in order to restrict collection of the impurities on the nozzle edge 20a and shorten the time required for forming the through hole 15 in the glass tube 16, the distance D is preferably in a range greater than or equal to 3 mm and less than or equal to 15 mm, further preferably greater than or equal to 5 mm and less than or equal to 15 mm, even further preferably greater than or equal to 7 mm and less than or equal to 12 mm.

Experimental examples in which the through hole 15 was formed through the through hole forming step by changing the distance D or like will now be described.

In experimental example 1, a gas mixture of oxygen and hydrogen was used as the fuel gas FG for forming the through hole 15 in the glass tube 16. In experimental example 1, the distance D between the nozzle edge 20a of the fuel gas nozzle 20 and the glass tube 16 was set to 3.0 mm, 5.0 mm, 7.0 mm, 10.0 mm, 12.0 mm, or 15.0 mm. Then, time T was measured from when the flame was directed toward the glass tube 16 to when the through hole 15 was formed. In experimental example 1, the fuel gas FG (gas mixture) was set so that the volume ratio of hydrogen to oxygen was 2, and the flow rate of the fuel gas FG was 2.0 L/min. The fuel gas nozzle 20 having the inner diameter of 0.4 mm was used. The glass tube 16 had the outer diameter of 16 mm and the tube wall thickness of 1.0 mm.

In experimental example 2, a gas mixture of LNG and oxygen was used as the fuel gas FG for forming the through hole 15 in the glass tube 16. In experimental example 2, the distance D between the nozzle edge 20a of the fuel gas nozzle 20 and the glass tube 16 was set to 3.0 mm. Then, time T was measured from when the flame was directed toward the glass tube 16 to when the through hole 15 was formed. In experimental example 2, the fuel gas FG (gas mixture) was set so that the volume ratio of oxygen to LNG was between 2.5 and 2.6, and the flow rate of the fuel gas FG was 2.0 L/min. The fuel gas nozzle 20 having the inner diameter of 1.0 mm was used. The glass tube 16 had the outer diameter of 16 mm and the tube wall thickness of 1.0 mm.

Figure 3:
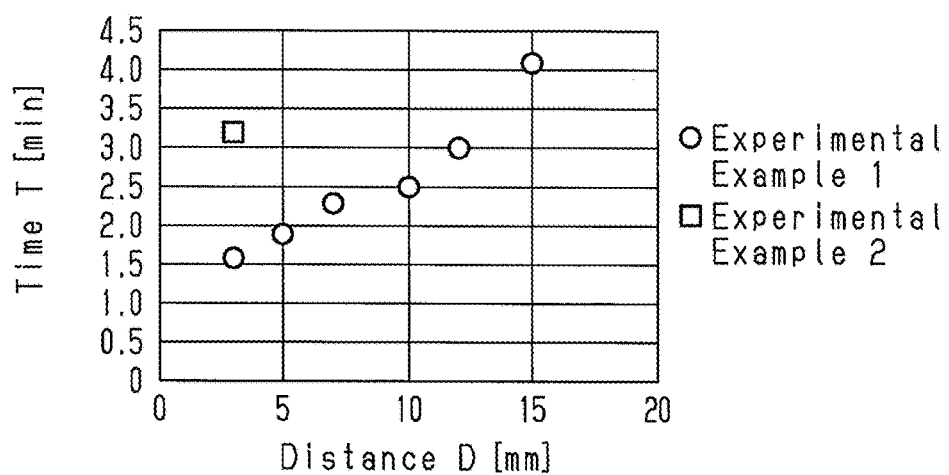
FIG. 3 is a graph showing the relationship of the distance from a nozzle edge to the glass tube and the time required for forming a through hole in the through hole forming step.

FIG. 3 shows the relationship of the distance D and the time T, which is from when the flame was directed toward the glass tube 16 to when the through hole 15 was formed, in experimental example 1 and experimental example 2. In experimental example 1, the through hole 15 was formed in a shorter time than experimental example 2 even when the distance D was increased.

Figure 4:
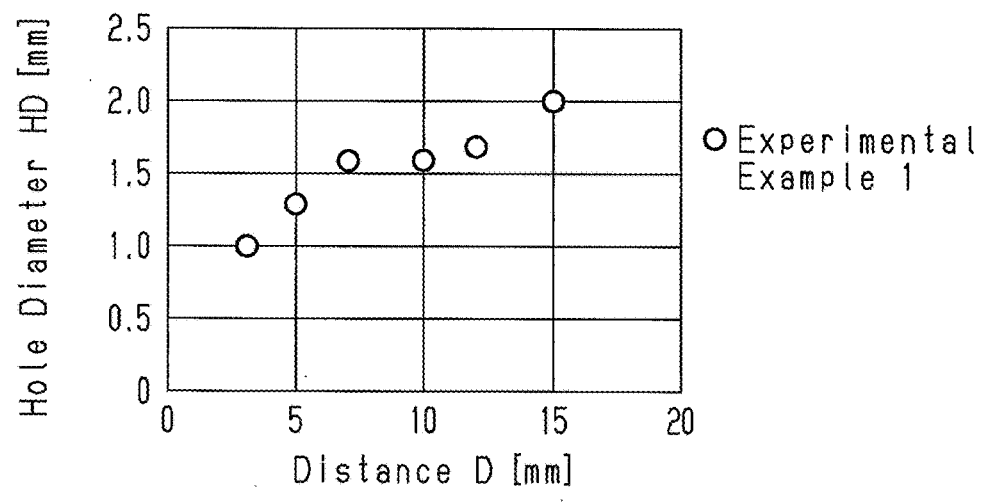
FIG. 4 is a graph showing the relationship of the distance from the nozzle edge to the glass tube and the diameter of the through hole in the through hole forming step.

FIG. 4 shows the relationship of the distance D and the diameter of the through hole 15 (hole diameter HD) formed in the glass tube 16 in experimental example 1. According to the result of experimental example 1, the hole diameter HD of the through hole 15 formed in the glass tube 16 can be changed when changing the distance D.

In the through hole forming step, the flow rate of the fuel gas FG emitted from the fuel gas nozzle 20 can be adjusted, for example, in accordance with the inner diameter of the fuel gas nozzle 20 (nozzle diameter). The flow rate of the fuel gas FG emitted from the fuel gas nozzle 20 is preferably greater than or equal to 1.5 L/min, further preferably greater than or equal to 1.7 L/min, and even further preferably greater than or equal to 1.9 L/min. The time required for forming the through hole 15 in the glass tube 16 can be shortened by increasing the flow rate of the fuel gas FG. The flow rate of the fuel gas FG emitted from the fuel gas nozzle 20 is preferably less than or equal to 3.0 L/min, and further preferably less than or equal to 2.5 L/min in order to prevent the tube wall of the glass tube 16 opposing the through hole 15 from being inadvertently melted after the through hole 15 is formed in the glass tube 16.

Preferably, the fuel gas nozzle 20 used in the through hole forming step has an inner diameter (nozzle diameter) that is greater than or equal to 0.2 mm. As the inner diameter of the fuel gas nozzle 20 increases, the inner diameter of the through hole 15 in the glass tube 16 increases. Preferably, the inner diameter of the fuel gas nozzle 20 (nozzle diameter) is less than or equal to 1.0 mm in order to prevent the inner diameter of the through hole 15 in the glass tube 16 from being excessively large.

As shown in FIG. 2, in the through hole forming step, it is preferred that the through hole 15 be formed while air is blown into the glass tube 16 from the opening 18 in the second end 16b of the glass tube 16 toward the opening 17 in the first end 16a of the glass tube 16. A blast nozzle 22 is used to send ventilation gas VG into the glass tube 16 from the outside of the glass tube 16 toward the opening 18 in the second end 16b of the glass tube 16. The blast nozzle 22 may be inserted into the glass tube 16 through the opening 18 in the second end 16b of the glass tube 16. Preferably, ventilation gas VG is air or an inert gas.

As shown in FIG. 5, in the sealed portion forming step of the method for manufacturing the glass tube 11, the sealed portion 13 is formed by thermally processing a predetermined portion of the glass tube 16 between the first end 16a and the through hole 15 subsequent to the through hole forming step. More specifically, in the sealed portion forming step, the sealed portion 13 is formed by heating a portion of the glass tube 16 located between the first end 16a of the glass tube 16 and the through hole 15 in a circumferential direction while rotating the glass tube 16. Then, an external force is applied to the glass tube 16 so as to separate portions sandwiching the heated portion of the glass tube 16 from each other.

For example, when using a linear burner 23, the sealed portion forming step can be performed while moving the glass tube 16. More specifically, first, the glass tube 16 is arranged so that the axis of the glass tube 16 is orthogonal to a longitudinal direction of a flame 23a of the linear burner 23. Next, the glass tube 16 is moved in the longitudinal direction of the flame of the linear burner 23 while rotating the glass tube 16. In this case, an external force is applied to the glass tube 16 so that the portions sandwiching the heated portion of the glass tube 16 are separated from each other. This deforms the heated portion of the glass tube 16 to close and form the sealed portion 13. Instead of forming the sealed portion 13 while moving the glass tube 16, the sealed portion 13 may be formed by heating the glass tube 16 at a fixed position while rotating the glass tube 16 and applying an external force to the glass tube 16.

As described above, the glass tube 11 (glass item including tube portion 12, sealed portion 13, opening 14, and through hole 15) manufactured through the through hole forming step and the sealed portion forming step is used to manufacture a glass container. As known in the art, a glass container is obtained through a manufacturing method including a step in which the glass tube 11 is arranged so that the sealed portion 13 is located at an upper side, and a portion located at a predetermined length separated from the opening 14 of the glass tube 11 is heated and cut. When manufacturing such a glass container, the through hole 15 of the glass tube 11 functions as a ventilation hole that adjusts the pressure and temperature in the tube portion 12 of the glass tube 11.

The glass tube 11 is suitable for use when manufacturing a glass container that requires a relatively high cleanliness. The glass tube 11 is used, for example, to manufacture a medicinal container or a food container. In particular, the glass tube 11 is suitable for use when manufacturing a medicinal container. Examples of the medicinal containers include a syringe, a vial, and an ampoule. The glass tube 11 used to manufacture a medicinal container is, for example, made of a borosilicate glass. Further, with the glass tube 11 used for manufacturing a medicinal container, the outer diameter of the tube portion 12 (outer diameter of glass tube 16) is, for example, in a range greater than or equal to 5 mm and less than or equal to 75 mm. The tube wall thickness of the tube portion 12 (tube wall thickness of glass tube 16) is, for example, in a range greater than or equal to 0.3 mm and less than or equal to 3.0 mm.

The above embodiment has the advantages described below.

(1) The method for manufacturing the glass tube 11 includes the through hole forming step and the sealed portion forming step. In the through hole forming step, the through hole 15 is formed in the tube wall near the first end 16a of the glass tube 16 that includes the opening 17 in the first end 16a and the opening 18 in the second end 16b. In the sealed portion forming step, the sealed portion 13 is formed by performing thermal processing on a predetermined portion of the glass tube 16 located between the first end 16a and the through hole 15 subsequent to the through hole forming step.

With this method, the sealed portion 13 is formed after the through hole 15 has been formed so that the impurities produced when forming the through hole 15 can be discharged from the opening 17 in the first end 16a of the glass tube 16. This enhances the cleanliness of the inside of the glass tube 11.

(2) In the through hole forming step, the through hole 15 is formed while blowing air into the glass tube 16 from the opening 18 in the second end 16b of the glass tube 16 toward the opening 17 in the first end 16a of the glass tube 16.

In this case, the impurities produced when forming the through hole 15 are forced out of the opening 17 in the first end 16a of the glass tube 16. This further enhances the cleanliness of the inside of the glass tube 11.

(3) Preferably, the through hole 15 is formed with the burner 19 while the glass tube 16 is supported at a position where the axis of the glass tube 16 is horizontal or a position where the first end 16a of the glass tube 16 is located at the upper side.

In this case, volatile substances produced when forming the through hole 15 in the glass tube 16 with the burner 19 are easily discharged from the opening 17 in the first end 16a of the glass tube 16. This further enhances the cleanliness of the inside of the glass tube 11.

(4) Preferably, a gas mixture of oxygen and hydrogen is used as the fuel gas FG for the burner 19. Further, it is preferred that the burner 19 be located so that the distance D between the nozzle edge 20a of the burner 19 when being used and the glass tube 16 is greater than or equal to 3 mm.

In this case, the gas mixture of oxygen and hydrogen used as the fuel gas FG for the burner 19 shortens the time required for forming the through hole 15 in the glass tube 16. Further, the through hole 15 is formed in the glass tube 16 with the burner 19 that is spaced apart from the glass tube 16 so that the distance D between the nozzle edge 20a of the burner 19 and the glass tube 16 is greater than or equal to 3 mm. This prevents the impurities (volatile substances) produced while forming the through hole 15 from collecting on the nozzle edge 20a of the burner 19. Accordingly, the nozzle of the burner 19 is replaced or cleaned less frequently. This improves the productivity of the glass tube 11 and reduces the manufacturing cost of the glass tube 11.

(5) Preferably, the glass tube 11 manufactured through the method of the present invention is used as a medicinal container. A medicinal container requires high cleanliness. Thus, the glass tube 11 is suitable for use when manufacturing a medicinal container.

Modified Examples

The above embodiment may be modified as described below.

Instead of the burner 19, for example, a laser light or a drill may be used to form the through hole 15 in the glass tube 16.

The through hole 15 may be formed without sending air into the glass tube 16.

For example, if impurities produced while forming the through hole 15 in the glass tube 16 are likely to fall, the through hole 15 may be formed while the glass tube 16 is supported in a position in which the second end 16b of the glass tube 16 is located at an upper side.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

DESCRIPTION OF REFERENCE CHARACTERS

11) glass tube; 13) sealed portion; 14, 17, 18) opening; 15) through hole; 16) glass tube; 16a) first end; 16b) second end; 19) burner; 20a) nozzle edge; D) distance; FG) fuel gas

The invention claimed is:

1. A method for manufacturing a glass tube, the method comprising:
    forming a through hole in a tube wall of a glass tube with two ends including a first end and a second end, each end having an opening, the through hole being formed in the tube wall near the first end with the glass tube supported at a position where the first end of the glass tube is located at an upper side;
    discharging impurities produced during the through hole formation through the first end of the glass tube while the through hole is being formed; and
    forming a sealed portion by performing thermal processing on a predetermined portion of the glass tube between the first end and the through hole after the formation of the through hole.

2. The method for manufacturing a glass tube according to claim 1, wherein the formation of the through hole is performed while sending air into the glass tube from the opening in the second end of the glass tube toward the opening in the first end of the glass tube.

3. The method for manufacturing a glass tube according to claim 1, wherein the formation of the through hole is performed with a burner in a state in which the glass tube is supported at a position where the first end of the glass tube is located at an upper side.

4. The method for manufacturing a glass tube according to claim 1, wherein
    the formation of the through hole is performed with a burner that uses a gas mixture of oxygen and hydrogen as fuel, and
    the burner is arranged so that a distance between a nozzle edge of the burner when being used and the glass tube is greater than or equal to 3 mm.

5. The method for manufacturing a glass tube according to claim 1, wherein the glass tube is used as a medicinal container.

* * * * *